Figure 1:
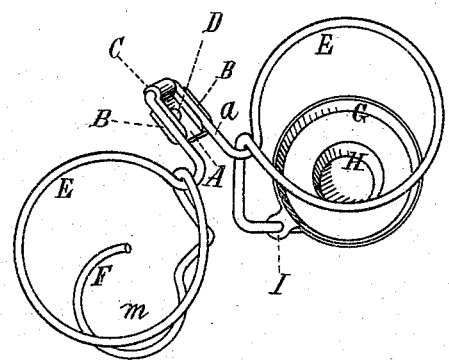

C. B. PETTENGILL.
BRACKETS.

No. 182,532. Patented Sept. 26, 1876.

Witnesses:
H. E. Metcalf,
Thomas H. Pryor,

Inventor:
Charles B. Pettengill,
Per C. A. Shaw,
Atty.

UNITED STATES PATENT OFFICE.

CHARLES B. PETTENGILL, OF EASTON, MASSACHUSETTS.

IMPROVEMENT IN BRACKETS.

Specification forming part of Letters Patent No. 182,532, dated September 26, 1876; application filed July 1, 1876.

*To all whom it may concern:*

Be it known that I, CHARLES B. PETTENGILL, of Easton, in the county of Bristol, State of Massachusetts, have invented a certain new and useful Improvement in Brackets, of which the following is a description sufficiently full, clear, and exact to enable any person skilled in the art or science to which my invention appertains to make and use the same, reference being had to the accompanying drawing, forming a part of this specification, in which—

Figure 1 is an isometrical perspective view.

My invention relates to that class of brackets which are employed in supporting flowerpots, &c.; and consist in a novel construction and arrangement of the parts, as hereinafter more fully set forth and claimed, by which a more effective device of this character may be produced than is now in ordinary use.

The nature and operation of my invention will be readily obvious to all conversant with such matters from the following description:

In the drawing, $a$ represents the body of the bracket, which is composed of a single piece of wire bent to form the circular pot-holders E E, the free ends F of the wire being arranged beneath the openings in the holders, and so shaped as to support the pan G. This pan is preferably composed of cast metal, and is provided with a reservoir, H, and loop I. The reservoir, when the pan is in position, projects vertically into the opening M, thus preventing all undue lateral movements of the pan.

The object of the loop I is to hold the pan more securely in its seat, the end F being passed through a hole in the loop in adjusting the pan for use.

The object of the reservoir H is to catch and hold the surplus water or overflow in watering the plants or flowers, and also to furnish a supply of water to the plants, to the roots of which it will be carried by capillary attraction through the ordinary aperture in the bottom of the pot when the same is placed in the pan.

The holder A is designed to be secured by a screw passing through the hole D to the meeting-rail of a window-sash, or any other convenient support. This holder is provided with an inwardly-projecting hook, C, at one end, and on either side with an upwardly-projecting flange or lip, B.

The body $a$, between the sections E E, is U-shaped, and in the use of my improvement the holder A is secured in a horizontal position, and the U-shaped part of the body passed under the hook C, the sides of the U-shaped portion resting on the holder, and against the flanges B, as shown.

It will be obvious that the body $a$, resting on the holder, will thus be prevented from injuring the window-rail, and that the flanges B will operate to prevent the body from moving laterally, and becoming detached from the hook C.

Having thus explained my invention, what I claim is—

1. In a bracket, the body $a$, provided with the pot-holders E E, the body and holders being integral or composed of a single piece of wire, and otherwise constructed and arranged to operate substantially as set forth.

2. In a bracket, the holder A, provided with the hook C and flanges B B, the body $a$, and the pot-holders E E, constructed and arranged to operate substantially as specified.

CHARLES B. PETTENGILL.

Witnesses:
C. A. SHAW,
A. M. LEONARD.